R. J. GOODSON.
WHEEL CONSTRUCTION.
APPLICATION FILED AUG. 18, 1919.
1,351,640.
Patented Aug. 31, 1920.
3 SHEETS—SHEET 1.
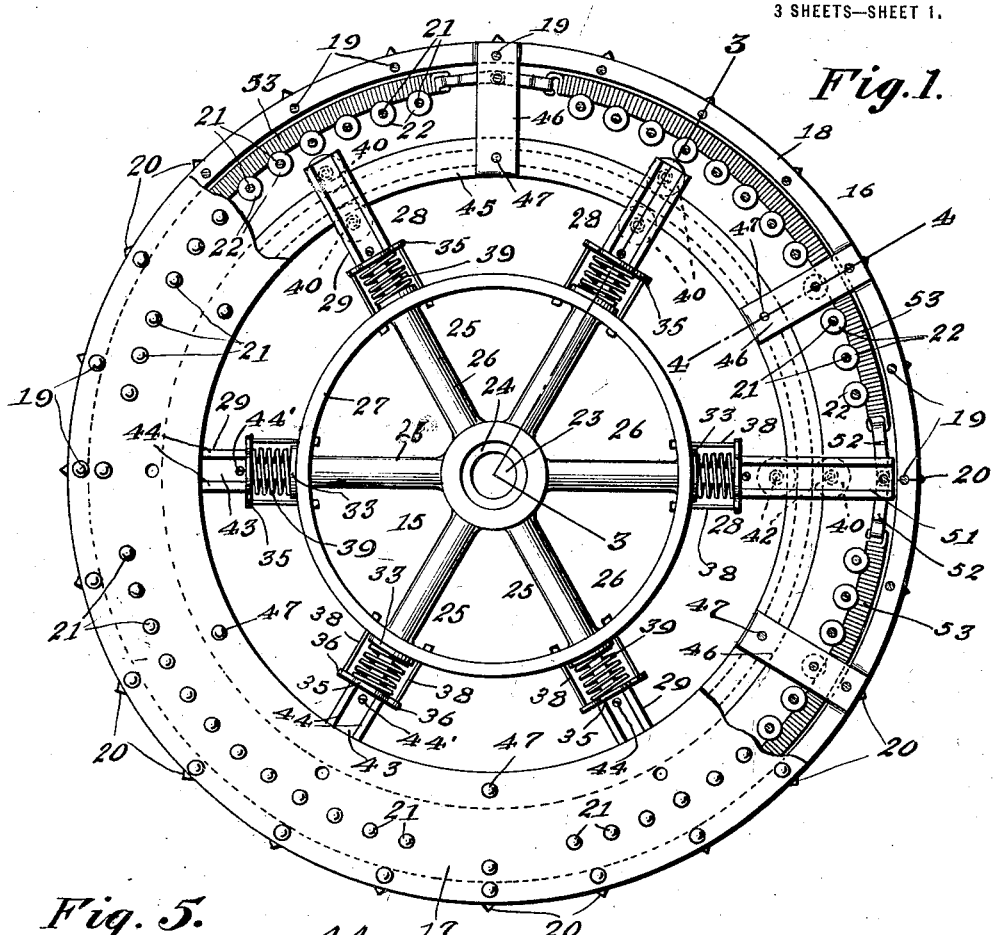
Fig. 1.
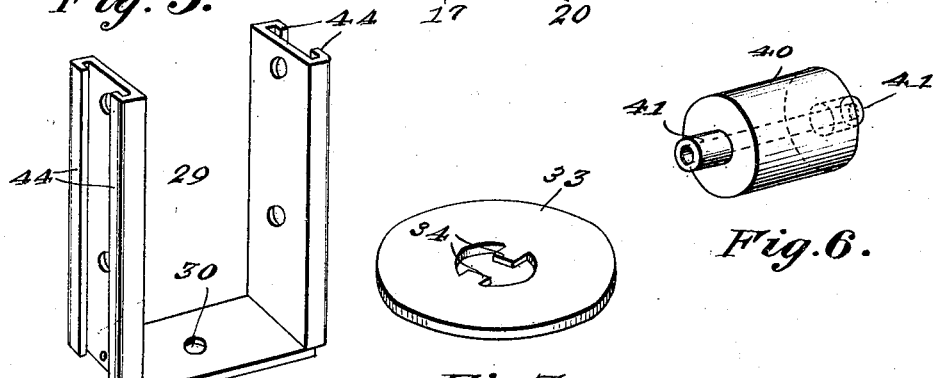
Fig. 5.
Fig. 7.
Fig. 6.
WITNESS:
W. A. Thomas
Rasey J. Goodson
INVENTOR.
BY
Victor J. Evans
ATTORNEY.

R. J. GOODSON.
WHEEL CONSTRUCTION.
APPLICATION FILED AUG. 18, 1919.
1,351,640.
Patented Aug. 31, 1920.
3 SHEETS—SHEET 2.
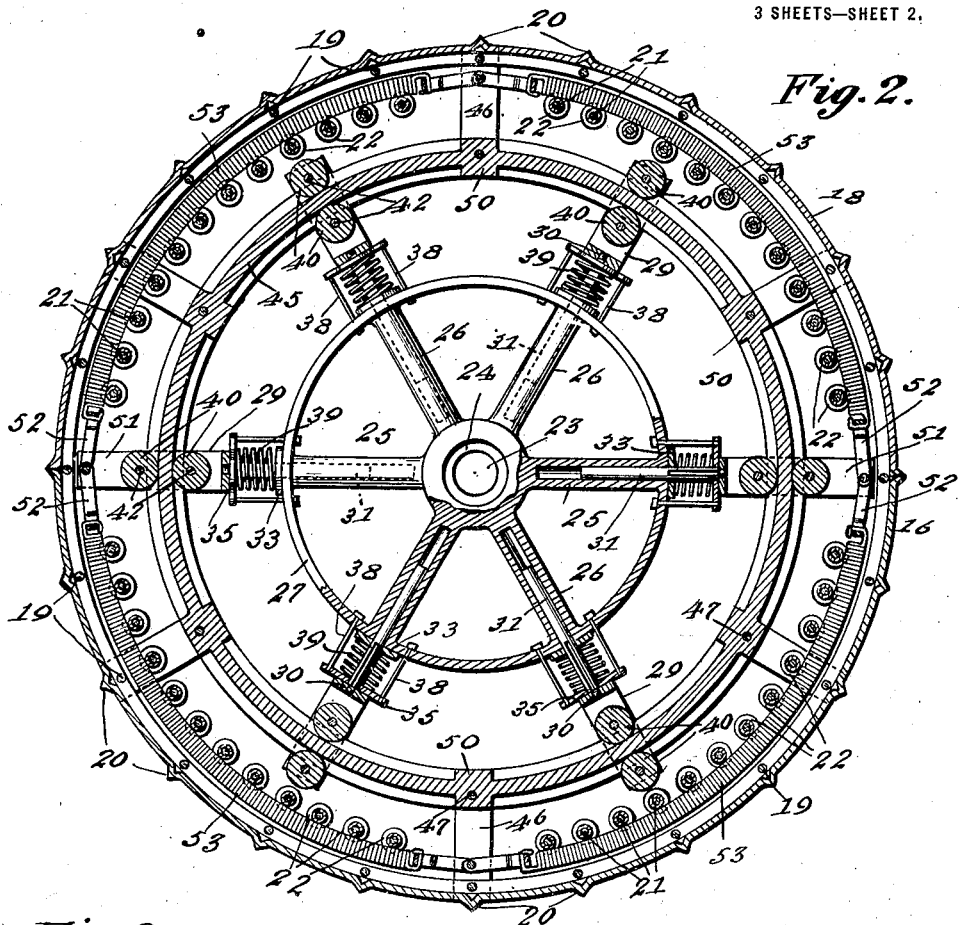
Fig. 2.
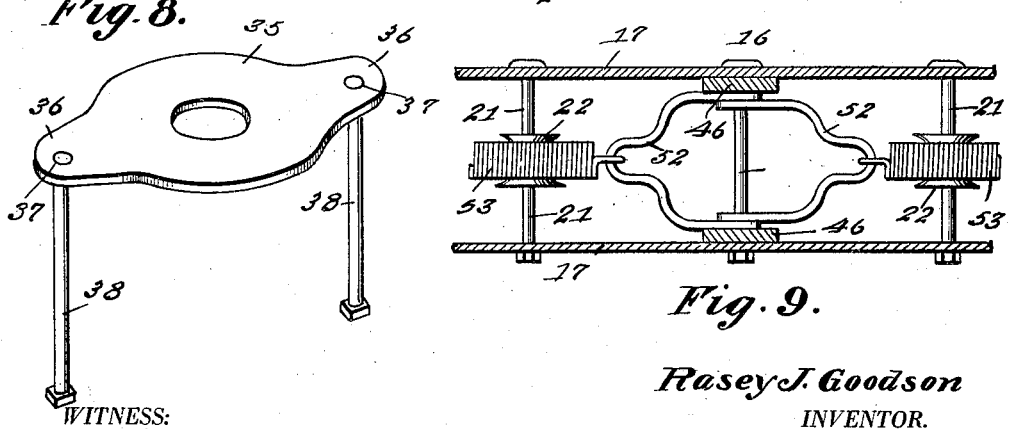
Fig. 8.
Fig. 9.
WITNESS:
R. A. Thomas
Rasey J. Goodson
INVENTOR.
BY
Victor J. Evans
ATTORNEY.

R. J. GOODSON.
WHEEL CONSTRUCTION.
APPLICATION FILED AUG. 18, 1919.

1,351,640.

Patented Aug. 31, 1920.
3 SHEETS—SHEET 3.

WITNESS:
R. A. Thomas

Rasey J. Goodson
INVENTOR.
BY
Victor J. Evans
ATTORNEY.

UNITED STATES PATENT OFFICE.

RASEY J. GOODSON, OF APPLETON CITY, MISSOURI.

WHEEL CONSTRUCTION.

1,351,640.  Specification of Letters Patent.  Patented Aug. 31, 1920.

Application filed August 18, 1919. Serial No. 318,277.

*To all whom it may concern:*

Be it known that I, RASEY J. GOODSON, a citizen of the United States, residing at Appleton City, in the county of St. Clair and State of Missouri, have invented new and useful Improvements in Wheel Constructions, of which the following is a specification.

This invention relates to vehicle wheels, and particularly to wheels of the spring type, and has for an object the provision of a wheel in which shock and jar due to travel over uneven surfaces is taken up by the wheel and prevented from being transferred to the body of the vehicle, the wheel being especially adapted for use on motor-operated vehicles, and particularly farm tractors and the like.

Another object is the provision of a wheel having an inner section and an outer section, said sections being relatively movable and provided with means whereby they will be automatically adjusted to maintain their proper relative positions.

Another object is the provision of a spring wheel in which the inner and outer sections are relatively movable, both circumferentially and radially and yieldingly connected in a manner to distribute the weight of the vehicle evenly over the entire area of the wheel and all of the yielding connections.

Another object is the provision of a novel form of connection between the inner and outer members, whereby a free relative rotary movement is permitted between the sections.

Another object of the invention is the provision of a wheel having inner and outer relatively movable sections in which the movement of the sections is automatically adjusted and transmitted by friction roller bearings and springs.

Figure 3:
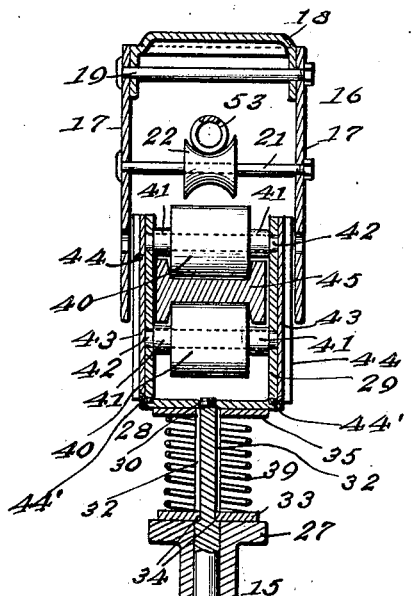
Figure 4:
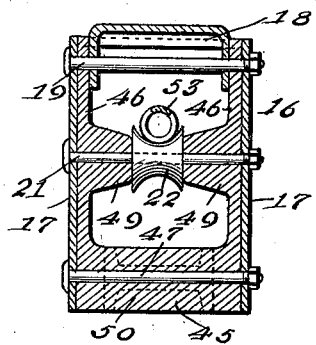
Figure 11:
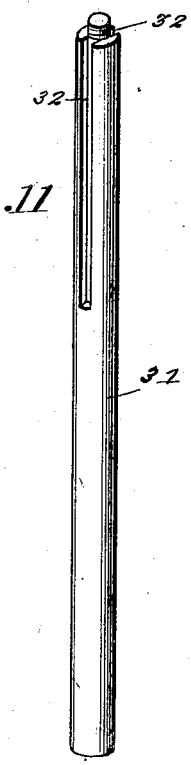
Figure 10:
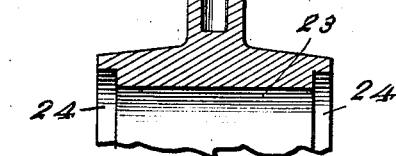
Figure 10:
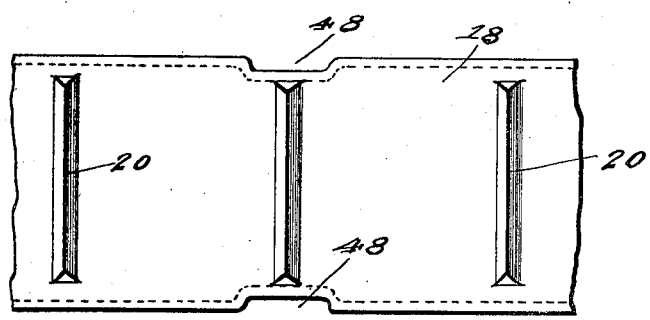

Other objects and advantages of the invention will appear as the following description is read in connection with the accompanying drawings, in which:

Figure 1 is a side elevation, partly broken away, of a wheel constructed in accordance with the present invention, Fig. 2 is a sectional view of the same, Fig. 3 is an enlarged section on the line 3—3 of Fig. 1, Fig. 4 is a similar view on the line 4—4 of Fig. 1, Fig. 5 is a detail perspective view of one of the guide yokes, Fig. 6 is a similar view of one of the anti-friction rollers, Fig. 7 is a like view of one of the spoke washers, Fig. 8 is a detail perspective view of the end plate and its connecting rods, Fig. 9 is a fragmentary section through the outer wheel section showing the manner of connecting the circumferential springs to the wheel, Fig. 10 is a fragmentary plan view of the rim of the wheel, and Fig. 11 is a detail perspective view of one of the guide rods of the spokes.

Referring to the drawings in detail, wherein like reference characters denote corresponding parts, the wheel is shown as formed of an inner or hub section 15 and an outer or rim section 16.

The outer section 16 comprises a pair of spaced flat annular rings 17, whose outer edges are connected by means of a channel-shaped tread 18, the latter being bolted to the rings 17 by means of transversely disposed bolts 19. The tread 18 is formed or otherwise provided with transversely disposed traction members 20, preferably in the form of ridges pressed outward from the tread. Spaced around the outer rim section 17 is a plurality of bolts 21, the latter serving to connect the rings 17 and to provide bearings for concaved rollers 22, the purpose of which will be hereinafter described.

The inner or hub section 15 is formed with a spindle-receiving portion 23, which may be provided with spaces 24 at each end for the reception of suitable anti-friction devices. Radiating from the spindle-receiving portion 23 are spokes 25. These spokes are formed in sections and comprise an inner tubular section 26, whose outer ends are connected by a ring 27 and an outer section 28. This last named section is formed of a substantially U-shaped guide 29, whose inner end is formed with a threaded opening 30 for the reception of one end of a guide rod 31. This guide rod operates in the tubular section 26 of the spoke and has its outer end formed with oppositely arranged longitudinal grooves 32 for the reception of a washer 33. This washer is indicated in Fig. 7, and is provided with inwardly extending lugs 34, which are received in the grooves 32. The outer end of the rod 31 adjacent the yoke 29 is surrounded by an end plate 35, which is formed with oppositely extending ears 36. These ears are provided with threaded sockets or openings 37 for the reception of one end of guide rod or bolt 38. The opposite end of this guide rod or bolt extends through an opening provided upon each side of each of the spokes 25. Interposed between the head 35 and the washer 33 is a coiled spring 39, the latter acting to force the yoke 29 outwardly. The free ends of the yoke 29 operate between the rings 17 of the outer or rim section 16 of the wheel and have mounted between them spaced rollers 40. These rollers are provided with spacing sleeves 41 at each end thereof, which engage the opposed inner faces of the arms of the yoke 29 and are held in position between the said arms by means of pins 43, which are mounted in bearings in openings formed in the arms of the yokes. These pins are held in position by means of plates 43, which are received within flanges 44 located at each edge of the arms of the yoke so as to provide guides for the plates. When in position, the plates are held against movement through the medium of a screw 44'.

The rollers 40 operate over a track 45, which is carried by the outer or rim section 16. This track is in the form of an annulus, whose cross sectional shape is preferably that of an I-beam so as to provide inner and outer grooves for the reception of the rollers 40. The track 45 is connected to the outer or rim section 16 through the medium of oppositely located, radially disposed arms 46. One end of these arms is bolted to the track as shown at 47, while the opposite end is bolted within the depression 48 formed in the tread 18 and between the edge of the said tread and the ring 17. This provides a rigid connection between the track and the outer or rim section. Certain of the arms 46 are provided with laterally and inwardly extending bosses 49, so that certain of the rollers 22 will operate between these bosses. As illustrated in Fig. 2, the track 45 is provided at spaced intervals with reinforcing ribs 50, which interrupt the grooves of the track, these ribs being located at the point of connection with the arms 46.

Certain of the yokes 29 have their arms extended as indicated at 51 and these arms have secured thereto, through the medium of clevises 52, one end of coiled springs 53, the opposite ends of these springs being secured to certain of the arms 46, which are disposed at an angle of substantially 90° with respect to the extensions 51 of the arms of the yokes 29. These springs lie upon the rollers 22, which rollers act to maintain the springs in proper position with respect to the periphery of the wheel.

In use, the weight of the vehicle is transferred from the inner or hub section to the outer or rim section through the medium of the sectional spokes and should the wheels strike an obstacle or other uneven surface to cause the inner or hub section to move with respect to the outer or rim section, the said first named section will travel downwardly in a substantially vertical line and, owing to the arrangement of the spokes and the rim, the strain or weight will be evenly distributed throughout the entire area of the wheel, compressing all of the springs 39. The two upper and lower springs shown in Fig. 2, will be compressed practically the same and the rollers 40 carried by the spokes upon which these springs are mounted, will travel around the periphery of the track 45, the upper rollers of the upper spokes gripping or binding upon the outer surface of the track and the upper rollers of the lower spokes gripping or binding upon the inner surface of the track and serving to arrest the movement of the inner or hub section, the action being substantially that of a braking action, the said rollers increasing their frictional contact with these surfaces of the track as the inner section of the wheel rotates with respect to the outer section. During this action the spokes which occupy in Fig. 2 a horizontal position, have a more or less free movement with respect to the outer or rim section, their springs being depressed in proportion to the amount of travel of the spokes. The springs 53 also act to retard the downward or rotary movement of the inner or rim section, and when the limit of this movement has been reached, these springs serve to automatically return the inner or rim section to its normal position.

The invention is susceptible of various changes in its form, proportions and minor details of construction, the form of the invention herein shown and described being only one of many forms for carrying out the idea. The right is, therefore, reserved to make any changes that properly fall within the scope of the appended claims.

Having thus described the invention, what I claim is:

1. A wheel comprising an inner hub section, spokes carried by said section, an outer rim section, a concentrically arranged annulus included in said outer rim section, means including rollers carried by the spokes and engageable upon the inner and outer periphery of the annulus to provide a relative circumferential movement between the hub and rim sections, and yielding means for resisting such movement.

2. A wheel comprising an inner hub section, spokes carried by said section, an outer rim section, a concentrically arranged annulus included in said outer rim section, means including anti-friction devices engageable with the inner and outer peripheries of the annulus for connecting the spokes to the outer rim section in a manner to resist the relative radial movement of the sections and to permit relative circumferential movement between the hub section and the rim section, and yieldable means for resisting such movement.

3. A wheel comprising an inner hub section and an outer rim section, a concentrically arranged annulus carried by the rim section and spaced from the rim, radially yieldable spokes carried by the hub section and having their outer bifurcated ends disposed upon opposite side edges of the annulus, means carried by the spokes for engagement with the inner and outer peripheries of the annulus and springs connecting the spokes and rim section.

In testimony whereof I affix my signature.

RASEY J. GOODSON.